(No Model.)
C. A. LANGER.
VEGETABLE CUTTING AND GRATING MACHINE.
No. 573,431. Patented Dec. 15, 1896.
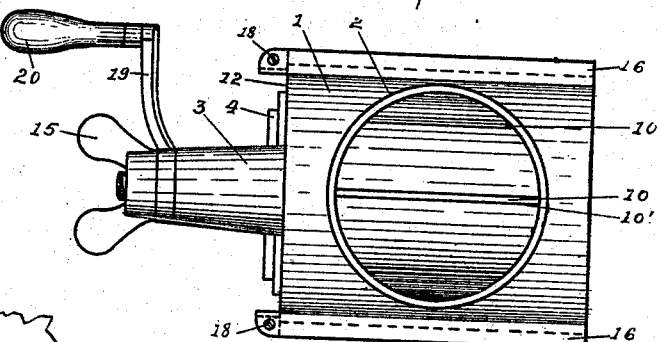
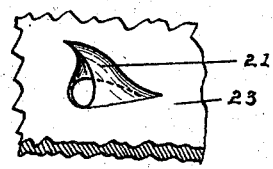
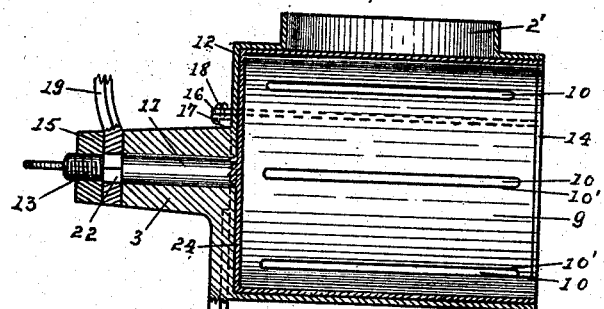
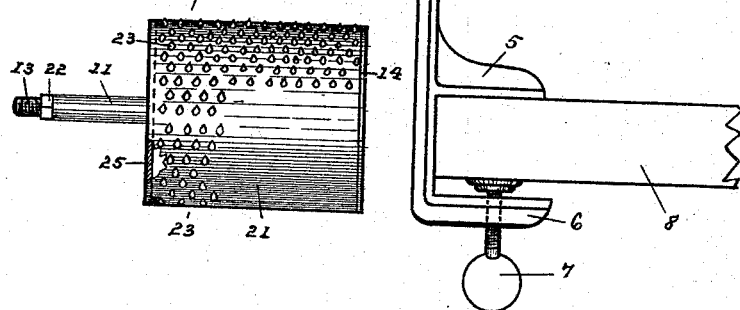
WITNESSES:
N. Webster Schlater
Minnie E. Schlater
Charles A. Langer INVENTOR
BY Chapin & Denny
his ATTORNEYS.

UNITED STATES PATENT OFFICE.

CHARLES A. LANGER, OF FORT WAYNE, INDIANA.

VEGETABLE CUTTING AND GRATING MACHINE.

SPECIFICATION forming part of Letters Patent No. 573,431, dated December 15, 1896.

Application filed March 14, 1896. Serial No. 583,180. (No model.)

*To all whom it may concern:*

Be it known that I, CHARLES A. LANGER, a citizen of the United States, residing at Fort Wayne, in the county of Allen, in the State of Indiana, have invented certain new and useful Improvements in Vegetable Cutting and Grating Machines; and I do hereby declare that the following is a full, clear, and exact description of the invention, which will enable others skilled in the art to which it appertains to make and use the same, reference being had to the accompanying drawings, which form part of this specification.

My invention relates to improvements in vegetable cutting and grating machines, and comprises a stationary containing-cylinder, open at its rear end and having an integral forwardly-extended journal-bearing for the power-shaft of the rotating drum, integral upright supporting-standards, and a cylindrical hopper upon its upper surface, a rotating cutting-drum of sheet metal detachably mounted in said stationary cylinder, having an integral power-shaft arranged in said journal-bearing and having an operating crank-handle and a series of integral peripheral cutting-blades arranged in parallel relation and at right angles to the path of rotation, the said cutting-cylinder also having a series of peripheral inlet-openings adjacent to the said cutting-blades and having a discharge-opening at its forward end, and a detachable rotary grating-cylinder having its periphery provided with cutting-points projecting in the direction of rotation.

The object of my invention is to provide a cheap and convenient vegetable-cutting machine having interchangeable and detachable rotary cutting and grating cylinders.

The novel features of my invention consist in the construction and relative arrangement of the removable cutting and grating cylinders.

Similar numerals refer to similar parts throughout the several views, in which—

Figure 1 is a top plan view of my improvement, showing a part of the containing cutting-cylinder seen through the hopper-opening. Fig. 2 is a side elevation, including the supporting-standard and means for securing the machine to a table, with the cutting-cylinder in vertical axial section. Fig. 3 is a detail of the detachable rotary grating-cylinder. Fig. 4 is a detail of the grater cutting-points.

The cylinder 1, preferably of sheet metal and of any desired size, is open at its rear end, but has a cylindrical cast-metal head 12 at its forward end, having an integral concentric and extended journal-bearing 3 for the actuating-shaft of the cutting or grating drum, Fig. 2. The said head 12 is provided with opposite peripheral lugs 17, which can be rigidly secured to the opposite longitudinal flanges 16 by means of the screws 18, thereby firmly securing the head in position. The said flanges 16 extend horizontally the entire exterior length of the cylinder-shell 1 and are rigidly secured to the shell and have their forward ends projecting beyond the said head of the shell over the lugs 17, with perforations for the insertion of the screws 18, and thereby serve the double purpose of securing the cylinder-head in position and strengthening and stiffening the shell to preserve its true cylindrical form. The said cylinder 1 has upon its upper surface a cylindrical hopper 2, having a circular opening 2', in which the vegetables to be sliced or grated are placed. The said head 12 is also provided with two upright supporting-standards 4, cast integral therewith, of proper size and strength and having their lower ends united by the integral cross-piece or ledge 6, Fig. 2, having a vertical thumb-screw 7 centrally mounted therein. The said standards have also the integral twin lugs 5 upon the front side thereof and equally distant from the ledge 6, adapted to rest upon the table 8 or other support, and are firmly secured thereto by the said thumb-screw 7. The periphery of the open end of said cylinder is finished by a proper bead in a well-understood manner.

The rotary cutting drum or cylinder 9 of non-corrosive sheet metal is open at its rear end, whose perimeter has a proper bead 14, and has at its forward end a cast metallic head 24, secured therein by rivets or other proper manner, and having an integral concentric forwardly-extended shaft 11, adapted to be rotatably mounted in the said journal-bearing 3, and having upon its free end the squared portion 22, upon which the crank 19, having a handle 20, is fixed and secured thereon by the thumb-nut 15 on the screw-threaded portion 13. The said drum or cylinder 9 is provided with a series of integral peripheral longitudinal cutting-blades 10, arranged in parallel relation and at right angles to the direction of rotation of said cylinder, the edges of said blades facing the direction of rotation. The said drum is also provided with a series of peripheral discharge-openings 10', adjacent to and coincident with the said cutting-blades, the rear edge of said openings being arranged upon a slightly lower plane than that of the cutting-blades which form the other side of said discharge-openings. The cutting-drum 9 thus constructed is rotatably mounted in said cylinder 1 and adapted to be actuated therein by the crank-handle 19. The grating-drum 21, Fig. 3, of equal size and similar construction to the said cutting-drum 9, has its periphery made of non-corrosive sheet metal provided upon its outer edge with a proper bead 14 and has its outer surface provided with a series of radial grating-points 23, stamped therefrom in a proper manner and having their cutting-points projecting in the direction of rotation (shown in enlarged detail in Fig. 4) and arranged in parallel longitudinal rows, but alternating circumferentially, as seen in Fig. 3. The said grating-drum is also provided upon its forward end with the cast-metal head 25, having the integral concentric forwardly-projecting actuating-shaft 11, adapted to be rotatably mounted in the journal-bearing 3 and having upon its free end the square surface 22 for its operating-handle 19 and the screw-threaded end 13 for the thumb-nut 15. The said grating-drum is thus adapted to replace at pleasure the said cutting-drum.

The operation of my improvement is obvious, as thus described, and briefly stated is as follows: When the invention is rigidly fixed in position upon a suitable table 8 or other support, the cabbage-head or other vegetable is placed in the opening 2 and firmly pressed against the perimeter of the cutting-drum with one hand, while with the other hand the operator rotates the said drum by means of the said crank-handle. As the said cutting-blades 10 are uniformly arranged with their cutting edge pointing in direction of the rotation, and as the corresponding discharge-openings 10' have their other edge arranged upon a plane slightly below that of the said blades, it is obvious that the sliced portion of the vegetable will automatically and uniformly enter the said openings successively, as the rotating blades pass the said hopper 2, and will be discharged through the open end thereof in a proper receptacle.

When it is desired to subject the vegetable to the operation of grating instead of slicing, the said cutting-drum 9 is readily detached and replaced by the said rotary grating-drum 21, by the use of which the grated portions are discharged through the said openings of the said grating-points as they successively pass the said hopper.

My improved vegetable cutter and grater can be made of any desired size and proportion, according to the class of vegetables upon which it is to be specially operated.

Having thus described my invention, what I claim as new, and desire to secure by Letters Patent, is—

1. In a vegetable cutting and grating machine, a housing-cylinder, having a sheet-metal horizontal shell of uniform diameter, open at its rear end, a feed-hopper opening, exterior opposite flanges rigidly secured to and extending the entire longitudinal length of the said housing-shell with their forward ends projecting beyond the shell-body, and having a cast-metal detachable head provided with lugs for securing it to the said shell by bolts through said flanges and lugs, and an integral concentric journal-bearing for the purpose specified, and also an integral supporting-standard provided with means for securing it to a platform or table and said housing-cylinder being adapted to receive a rotatable cutting or grating drum of uniform diameter open at its rear end, all arranged as described and shown.

2. In a vegetable cutting and grating machine, the combination of the containing housing-cylinder 1 having a sheet-metal horizontal shell of uniform diameter, having a discharge-opening at its rear end and a feeding-hopper opening 2 and exterior opposite flanges rigidly secured to and extending the entire length of said cylinder-shell with their forward ends projecting beyond the said shell, and having a cast-metal detachable head provided with lugs for securing it to the said cylinder-shell by bolts through said flanges and lugs and an integral concentric journal-bearing for the purpose specified, and an integral supporting-standard provided with means for detachably securing it to a table or platform, the rotatable drum 9 of uniform diameter, open at its rear end and having a series of integral peripheral horizontal cutting-blades 10 and a corresponding series of discharge-openings 10' and a fixed head 24 having an integral concentric shaft 11 rotatably mounted in said journal and adapted to receive an operating-handle upon the free end thereof, and the said drum being adapted to be revolubly mounted in said cylinder 1 as shown and described.

Dated and signed this 29th day of February, 1896.

CHARLES A. LANGER.

Witnesses:
BESSIE E. MANNIX,
ALICE M. BRUGNOT.